United States Patent [19]
Couprie

[11] Patent Number: 4,712,515
[45] Date of Patent: * Dec. 15, 1987

[54] DEVICE FOR EVACUATING INTO THE AMBIENT AIR COMBUSTION PRODUCTS FROM A CONDENSATION BOILER

[76] Inventor: Francois Couprie, 30, rue des Haies, 75020 Paris, France

[*] Notice: The portion of the term of this patent subsequent to Feb. 3, 2004 has been disclaimed.

[21] Appl. No.: 884,560

[22] Filed: Jul. 11, 1986

Related U.S. Application Data

[63] Continuation of Ser. No. 655,575, Sep. 28, 1984, Pat. No. 4,640,232.

[30] Foreign Application Priority Data

Sep. 30, 1983 [FR] France ................................ 83 15657

[51] Int. Cl.4 .............................. F22B 1/18; F24B 7/04
[52] U.S. Cl. .................................... 122/7 R; 165/133; 237/55; 98/48; 122/1 A; 122/17
[58] Field of Search .............. 165/133; 98/48; 122/17, 122/20 B, 1 A, 7 R; 237/55; 432/223

[56] References Cited

U.S. PATENT DOCUMENTS

| | | | |
|---|---|---|---|
| 2,711,683 | 6/1955 | Ryder | 98/48 |
| 2,764,972 | 10/1956 | Ryder | 126/307 |
| 2,916,983 | 12/1959 | Kinkead | 98/48 |
| 3,829,285 | 8/1974 | Beck | 432/223 |
| 4,241,874 | 12/1980 | Schossow | 237/55 |
| 4,330,577 | 5/1982 | Axlander | 165/133 |
| 4,359,086 | 11/1982 | Sanborn et al. | 165/133 |
| 4,416,254 | 11/1983 | DiPietro | 98/48 |
| 4,424,792 | 1/1984 | Shimek et al. | 98/48 |
| 4,437,217 | 3/1984 | Lallaye et al. | 165/133 |
| 4,448,136 | 5/1984 | White | 122/17 |

Primary Examiner—Henry C. Yuen
Attorney, Agent, or Firm—Staas & Halsey

[57] ABSTRACT

A device for evacuating into the ambient air combustion products from a condensation boiler, in which at least one downstream section of the conduit for evacuating the combustion products is coaxial to the conduit for admission of the combustion air necessary for the burner. Means are provided for returning to the outside a fraction of the air collected in said admission conduit. The downstream section of the conduit for evacuating the combustion products, the coaxial section of the admission conduit and the means for returning to the outside a fraction of the collected air define a first heat exchanger. Means also are provided for diluting the combustion product with the fraction of collected air, the dilution means being located in the vicinity of the opening for suction of the combustion air and for rejection of the combustion products into the ambient air. A second heat exchanger is provided between the first heat exchanger and the boiler, whereby the combustion products issuing from the boiler further heat the combustion air heated in the first heat exchanger. The second heat exchanger is of the trickling water type to increase the humidity of the combustion air. The invention is particularly applicable to boilers with vents.

6 Claims, 5 Drawing Figures

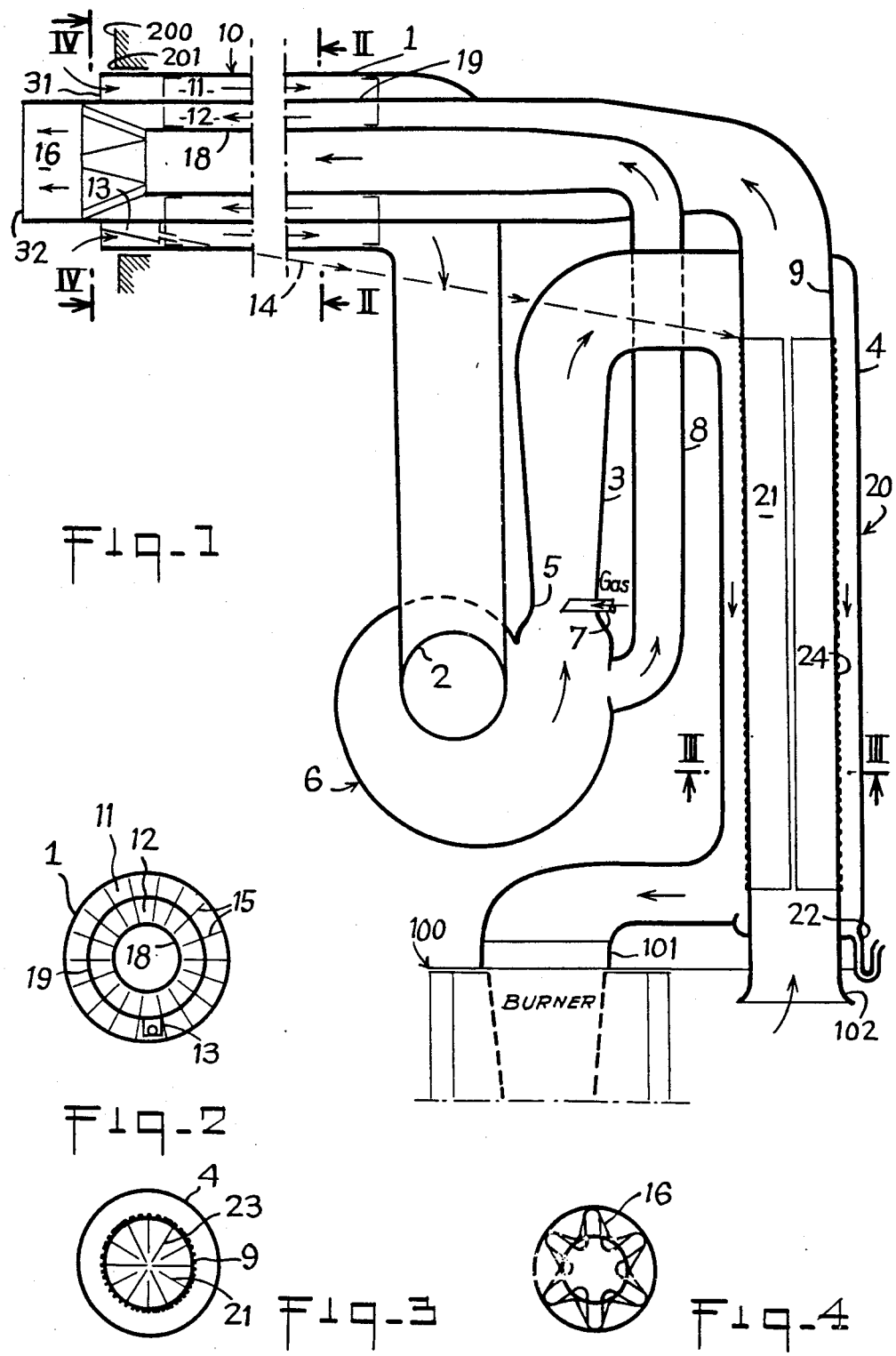

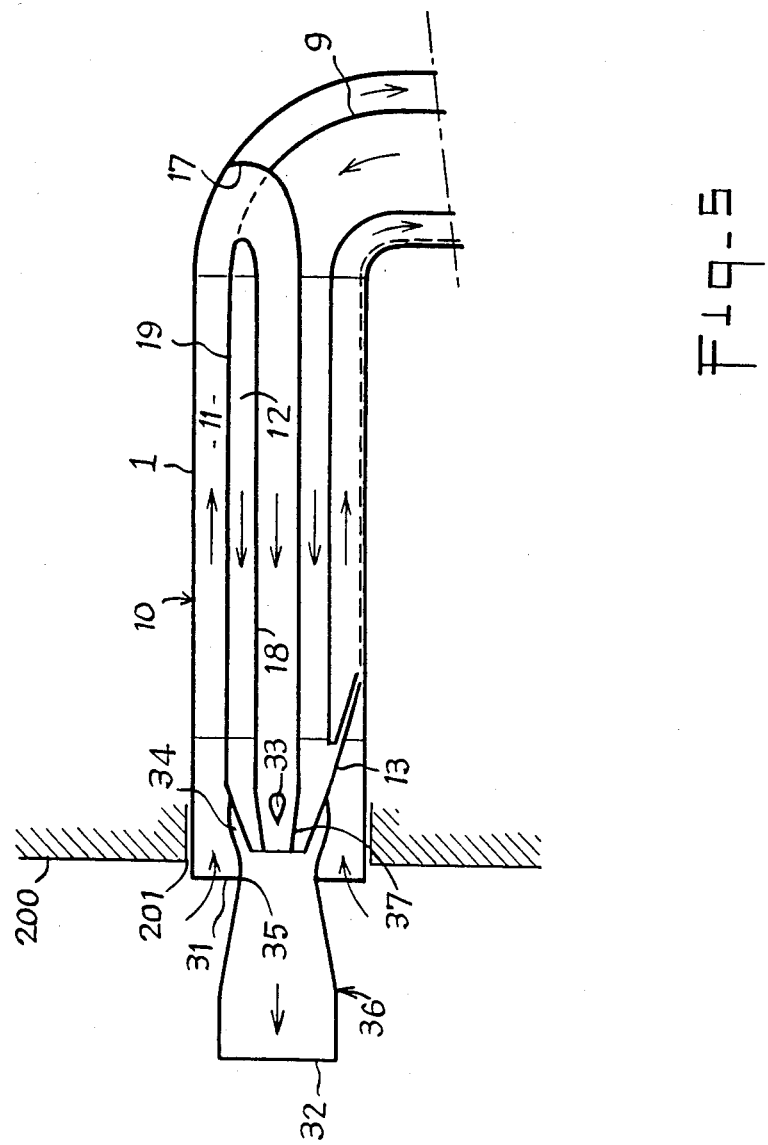

DEVICE FOR EVACUATING INTO THE AMBIENT AIR COMBUSTION PRODUCTS FROM A CONDENSATION BOILER

This is a continuation of co-pending application Ser. No. 655,575 filed on Sept. 28, 1984, now U.S. Pat. No. 4,640,232.

BACKGROUND OF THE INVENTION

The present invention relates to a device for evacuating into the ambient air combustion products from a condensation boiler, in which at least one downstream section of the conduit for evacuating the combustion products is coaxial to the conduit for admission of the combustion air necessary for the burner and a fraction of the air collected in the admission conduit is returned towards the outside.

A condensation boiler aims at using to a maximum the energy of combustion of the gas, by cooling the smoke issuing from combustion as much as possible. In fact, the output of a boiler is known to be all the better as the outlet temperature of the combustion products is low and therefore as the quantity of heat carried away by this smoke is less. Taking into account the fact that the combustion products contain carbon dioxide gas and water, in a condensation boiler, the aim is to lower the temperature of the combustion products to below the dew point in order to allow a condensation of part of the water cotained in these combustion products and consequently release the recoverable heat.

In a condensation boiler, the surface of the exchanger between the smoke and the water to be heated is increased, or a second exchanger-recuperator between the smoke and the water to be heated is added to the main exchanger. The outlet temperature of the combustion products remains, by construction, slightly higher than the inlet temperature of the water to be heated (sanitary water or water coming from a radiator circuit). Consequently, the combustion products are often evacuated from the boiler at a temperature such that part of the total energy theoretically recoverable is lost.

Furthermore, the combustion products being cooled to saturation at the moment when they are rejected into the atmosphere, such rejection is accompanied, in a relatively cold atmosphere, by a wreath of vapour several metres long which is particularly unaesthetic when the point where the smoke emerges is located on the wall of a dwelling for example.

SUMMARY OF THE INVENTION

It is precisely an object of the present invention to attenuate and even eliminate such a wreath of vapour during rejection of the combustion products into the atmosphere, whilst ensuring an improved output of the boiler for a given temperature of circulation water, or, for the same output, raising the temperature of this water by several degrees.

These objects are attained thanks to a device for evacuating into the ambient air combustion products from a condensation boiler of the type mentioned at the beginning of this specification, wherein the means for returning a fraction of the collected air to the outside comprise a central tube coaxial to the downstream section of the conduit for evacuating the combustion products and the conduit for admission of the combustion air surrounds said downstream section of the conduit for evacuating the combustion products; the downstream section of the conduit for evacuating the combustion products, the coaxial section of the admission conduit and the means for returning to the outside a fraction of the collected air define a first heat exchanger; and means for diluting the combustion products with said fraction of collected air are further provided, located in the vicinity of the opening for suction of the combustion air and for rejection of the combustion products into the ambient air.

More particularly, the first heat exchanger comprises said central tube, an intermediate tube made of a good heat-conductig metal which constitutes said downstream section of the conduit for evacuating the combustion products, an outer tube constituting said combustion air admission conduit and longitudinal fins extending radially on either side of the intermediate tube.

According to a first embodiment of the invention, said dilution means comprise an embossed element or perforated cone disposed at the outlet of the central tube, between the latter and the conduit for evacuating the combustion products, to enable the fraction of air returned to the outside to penetrate into the zone of circulation of the combustion products.

According to another embodiment of the invention, said dilution means comprise a mixing venturi formed at the outlet of the conduit for evacuating the combustion products and acting on the two faces of the annular gaseous jet constituted by the combustion products, so as to allow to carry away by suction the air returned by the central tube.

According to another advantageous feature, the device according to the invention further comprises a second heat exchanger between the combustion products issuing from the boiler and the combustion air reheated in the first heat exchanger, and the second heat exchanger is of the trickling water type to increase the humidity of the warm combustion air already reheated.

Means are associated with the first heat exchanger, in the vicinity of the outlet of the conduit for evacuating the combustion products, to collect the condensates formed in said conduit and to return them into the second heat exchanger to constitute the trickling water intended to increase the humidity of the preheated combustion air.

More particularly, the second heat exchanger comprises an outer tube constituted by a part of the conduit conducting air to the burner of the boiler, and a coaxial inner tube constituted by a part of the conduit for evacuating the combustion gases, the outer face of the inner tube is covered with a porous, hygrophilic material allowing the condensation water to trickle and the inner tube is made of a good heat-conducting metal and is internally provided with longitudinal ribs or baffles.

According to a particular feature, a circulation fan is disposed at the end of the first heat exchanger on the path of the air admission conduit and the means for separation between the combustion air intended for the burner and the fraction of air intended to constitute the dilution air are located at the outlet of the fan.

According to an advantageous application of the invention, the first heat exchanger and the dilution means associated therewith are disposed at the location of a vent connecting the boiler to the outside atmosphere, on the facade of a building.

The invention will be more readily understood on reading the following description with reference to the accompanying drawings.

BRIEF DESCRIPTION OF THE DRAWINGS

FIG. 1 is a schematic view in section of a first embodiment of the invention.

FIG. 2 is a sectional view showing a section of the first heat exchanger along line II—II of FIG. 1.

FIG. 3 is a sectional view showing a section of the second heat exchanger along line III—III of FIG. 1.

FIG. 4 is a sectional view showing a section of a first embodiment of dilution means along line IV—IV of FIG. 1.

FIG. 5 is a schematic view in section of a second embodiment of the invention.

DESCRIPTION OF THE PREFERRED EMBODIMENTS

Referring now to the drawings, FIG. 1 shows a device according to the invention which comprises a conduit 9, 19 for evacuating the combustion gases from a boiler 100, and a conduit 1, 3, 4 for supplying the boiler 100 with combustion air. The lower end of the vertical conduit 9 is connected to an orifice 102 in the boiler 100 whilst the end 32 of the horizontal downstream section 19 of the conduit for evacuating the combustion products opens out into the atmosphere through an opening 201 in the wall 200 of the building where the boiler 100 is located. The combustion air admission conduit 1 presents a first horizontal part which originates by its free end 31 through the opening 201 and surrounds the horizontal downstream section 19, then opens out by its end 2 into a fan 6 which returns, via a conduit 3 and a vertical conduit 4 surrounding the conduit 9 for evacuating the combustion gases. The air from conduit 4 then penetrates through an orifice 101 in the boiler to supply the forced air gas burner incorporated therein.

At the outlet of the fan 6, a branch conduit 8 extended by a horizontal section 18 located coaxially at the centre of the section of conduit 19, returns part of the air collected by the annular inlet orifice 31 towards a device 16 for diluting the air with the combustion gases before the latter are rejected into the atmosphere via the opening 32.

In the embodiment of FIG. 1, at the outlet of the fan 6, the section of conduit 3 serving to supply air to the burner forms a venturi 5 at the level of which it sucks the necessary quantity of combustible gas which is delivered through a supply conduit 7.

The device shown in FIG. 1 essentially defines a first heat exchanger 10 and a second heat exchanger 20.

The first heat exchanger 10 is essentially constituted by the horizontal section 1 of the air admission tube which opens out into the atmosphere, defining an annular opening 31, by the horizontal section 19 of the conduit for evacuating the combustion products and by the horizontal section 18 of the conduit for returning a fraction of the air collected by the annular orifice 31, these three sections of tube being coaxial. In the heat exchanger 10, the intermediate tube 19 is made of good heat-conducting metal and bears on its two faces longitudinal fins 15 which are distributed over the whole periphery of the tube 19 (cf. FIG. 2).

The outermost space 11 defined by the outer horizontal tube 1 and the horizontal section of the median tube 19 serves for the intake of fresh air which is progressively heated by the fins. The annular space 12 defined by the horizontal section of the median tube 19 and the inner tube 18 serves for the outlet of the humid smoke coming from conduit 9, which cools, condensing part of its vapour. The condensates formed are collected in a gutter element 13.

The air which is heated in the outer annular space 11 of the exchanger 10 is taken up by the fan 6. Part of this dry, heated air is returned via the branch conduit 8 into the central tube 18 of the exchanger 10 at the outlet of which it mixes with the combustion products issuing from space 12 thanks to an embossed element 16 generally truncated in form (FIG. 4) which connects the end of the inner tube 18 to the outlet of the smoke evacuating tube 19 and allows effective mixing of the air and the smoke which facilitates dilution of the combustion products in the air and, as the combustion products are mixed with warm, dry air, prevents the formation of a wreath of water vapour outside the wall 200.

The second heat exchanger 20 essentially comprises an outer vertical tube 4 connected to the section of conduit 3 and the inner vertical tube 9 for evacuating the combustion products. The latter is made of good heat-conducting metal and is internally provided with longitudinal fins 21, 23 (FIG. 3) on which a partial condensation is produced. The condensates drop into the boiler whence they are evacuated to the drain.

The outer face of the inner tube 9 is covered with a porous hygrophilic material 24. The water of condensation of the exchanger 10 collected by the gutter element 13 is directed via pipe 14 to the top of the exchanger 20 on the outer face of the central tube 9, where it trickles gently, forming a thin, continuous sheet of hot water, this contributing to increasing the humidity of the air heated in the exchanger 10 which circulates between the outer and inner tubes 4 and 9 of the exchanger 20. The water possibly in excess in the exchanger 20 is collected and separated from the flow of air/humid gas mixture and will join the overflows 22. The mixture of air and reheated, humidified gas then goes directly to the burner of the boiler.

In summary, the device of FIG. 1 comprises two distince air/smoke exchangers 10 and 20 on the path of the smoke after the last smoke/water exchanger located in boiler 100. The final exchanger 10 serves to heat fresh air whilst cooling the smoke to reduce its water content as much as possible. The heated air is taken up by the fan 6, at the outlet of which part is returned, via conduits 8, 18, directly towards the outlet to dilute the cooled smoke whilst the other part is mixed with the combustion gas and goes to the burner after having passed through the exchanger 20. In the exchanger 20, the crude smoke yields part of its heat which serves to vaporize the water collected in the exchanger 10 in order to increase the humidity of the already heated air. This improves the practical output of the boiler by raising the dew point of the smoke by several degrees. A certain self-regulation is produced in the operation in cascade of the two exchangers by the transfer of energy from one to the other in the form of water which is condensed then re-vaporized. Naturally, those exchanger parts whose outer wall is at a temperature higher than that of the ambient temperature must be heat-insulated.

By way of example of operation, if the outside atmospheric air introduced via the opening 31 is at a temperature of the order of 0° C. and if the combustion products emerge from the boiler through orifice 102 at a temperature of the order of 55° C., combustion products may be at a temperature of the order of 48° C. and dry air at about 35° C., between the exchanger 10 and the exchanger 20. The dry air which will serve to dilute the combustion products at device 16 will thus be at a temperature close to that of the combustion products rejected into the atmosphere, which will reliably avoid the formation of a wreath of water vapour. Furthermore, at the level of orifice 101 giving access to the burner, the water-saturated combustion air maintains a temperature of the order of about 35° C., and contributes to increasing the overall output by raising the dew point of the smoke.

However, numerous variants may be made of the device of FIG. 1. For example, the air leaving the fan and going towards the burner may firstly pass through the exchanger-humidifier 20 before being mixed with the combustion gas; the adjustments to be made to certain existing models of boilers are thus minimized.

FIG. 5 shows a second embodiment of the device for diluting the combustion products in the air, which is fitted at the outlet of an exchanger 10 similar to exchanger 10 of FIG. 1.

As may be seen in FIG. 5, the downstream section 19 of the conduit for evacuating the combustion products extends by a mixing venturi 36 preventing a neck 35, which is connected to the outer face of the end of conduit 19. The conduit 19 for evacuating the combustion products itself presents a convergent end 34 terminating at the level of the venturi neck 35. The central tube 18 through which a fraction of the air collected by the opening 31 is returned, after being heated in exchanger 10, also terminates in a convergent part 37 where a plurality of tubes 33 of profiled section which allow part of the warm air to pass over the outer face of the convergent portion 34, open out. Consequently, the assembly 36 forming the mixing venturi acts on the two faces of the annular gaseous jet constituted by the combustion products and the kinetic energy of these combustion products is used for sucking the warm dilution air issuing from the central tube 18. This device is directly fitted on an existing boiler, without modification other than an increase in the power of the fan. The wreath of water vapour is thus eliminated, but without affecting the output of the boiler.

In the embodiment of FIG. 5, the condensates formed in the exchanger 10 may simply be directed by the gutter element 13 in the bottom of the conduit 1 to be evacuated thereafter to the drain with the condensates from the boiler.

Numerous alterations and modifications of the structure herein disclosed will suggest themselves to those skilled in the art. It is to be understood, however, that the present disclosure relates to the preferred embodiments of the invention which is for purposes of illustration only and is not to be construed as a limitation of the invention. All such modifications which do not depart from the spirit of the invention are intended to be included within the scope of the appended claims.

I claim:

1. In a device for evacuating into the ambient air combustion products from a condensation boiler, in which at least one downstream section of a conduit for evacuating the combustion products is coaxial to a conduit for admission of the combustion air necessary for a burner of said boiler, and a fraction of the air collected in said admission conduit is returned towards the outside, the improvement which includes:

an opening for suction of the combustion air and for rejection of the combustion products into the ambient air;

means for returning a fraction of the collected air to the outside comprising a central tube coaxial to said downstream section of the conduit for evacuating the combustion products;

said conduit for admission of the combustion air surrounding said downstream section of the conduit for evacuating the combustion products;

said downstream section of the conduit for evacuating the combustion products, said coaxial section of the admission conduit and said means for returing to the outside a fraction of the collected air defining a first heat exchanger;

means for diluting the combustion products with said fraction of collected air located in the vicinity of said opening;

a second heat exchanger between said first heat exchanger and said boiler whereby the combustion products issuing from said boiler further heat the combustion air heated in said first heat exchanger, said second heat exchanger having a trickling water surface over which water trickles to increase the humidity of the combustion air already reheated; and collecting means inside said first heat exchanger, adjacent the outlet of the conduit for evacuating the combustion products, to collect the condensates formed in said conduit and duct means external to said first heat exchanger connected at one end to said collecting means and connected at its opposite end to said trickling water surface to return the collected condensates from said collecting means into said second heat exchanger to constitute the trickling water intended to increase the humidity of the preheated combustion air.

2. The device of claim 1, which includes longitudinal fins extending radially on either side of said downstream section of the conduit for evacuating the combustion products.

3. The device of claim 1, wherein said central tube has an outlet and said dilution means comprises a perforated cone disposed at said outlet, between the latter and said conduit for evacuating the combustion products, to enable the fraction of air returned to the outside to penetrate into the zone of circulation of the combustion products.

4. The device of claim 1, wherein a circulation fan is disposed at the end of said first heat exchanger in the path of said air admission conduit and means for separating the combustion air intended for the burner of said boiler and the fraction of air intended to constitute the dilution air are located at the outlet of said fan.

5. The device of claim 1, wherein said dilution means comprises a mixing venturi formed at the outlet of said conduit for evacuating the combustion products.

6. The device of claim 1, wherein said first heat exchanger and said dilution means associated therewith are disposed at the location of a vent connecting the boiler to the outside atmosphere, on the facade of a building.

* * * * *